Figure 1:
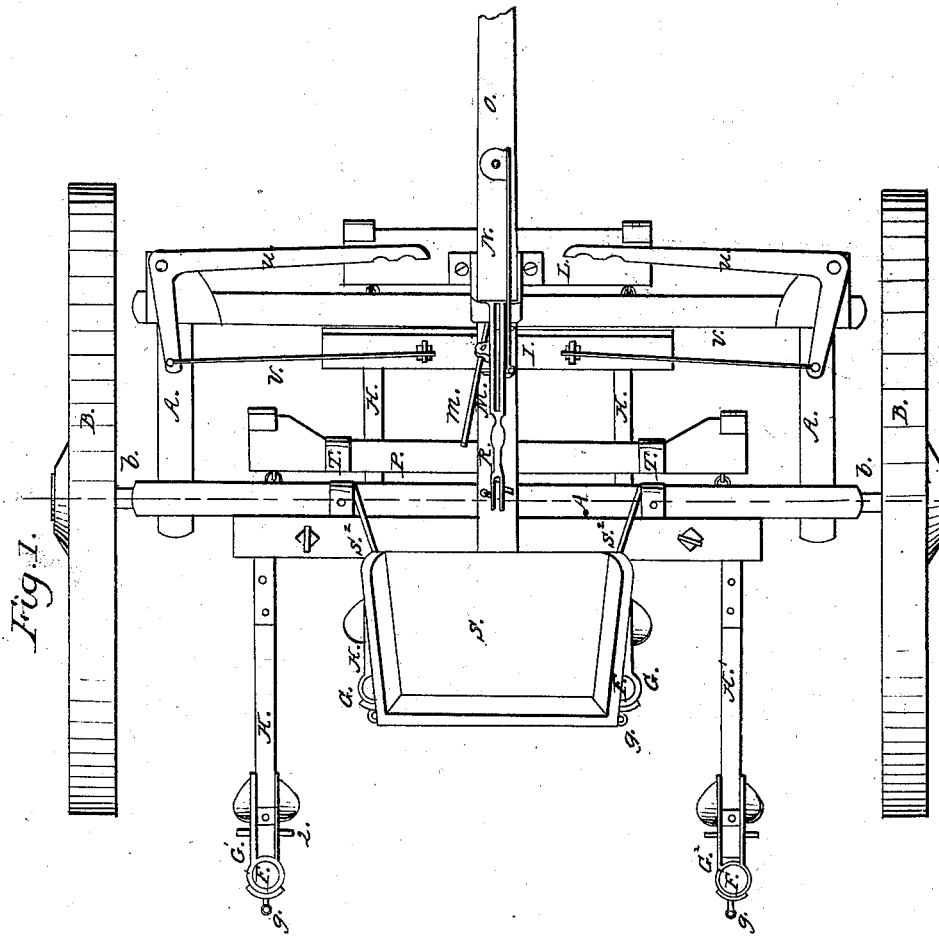

C. ROBERTS.
Wheel Cultivator.

No. 48,445.

2 Sheets—Sheet 1.

Patented June 27, 1865.

Witnesses:
Jas. P. Peyton
Oskar Hase

Inventor:
Cyrus Roberts
by his Atty
Baldwin & Son

C. ROBERTS.
Wheel Cultivator.
No. 48,445.
2 Sheets—Sheet 2.
Patented June 27, 1865.
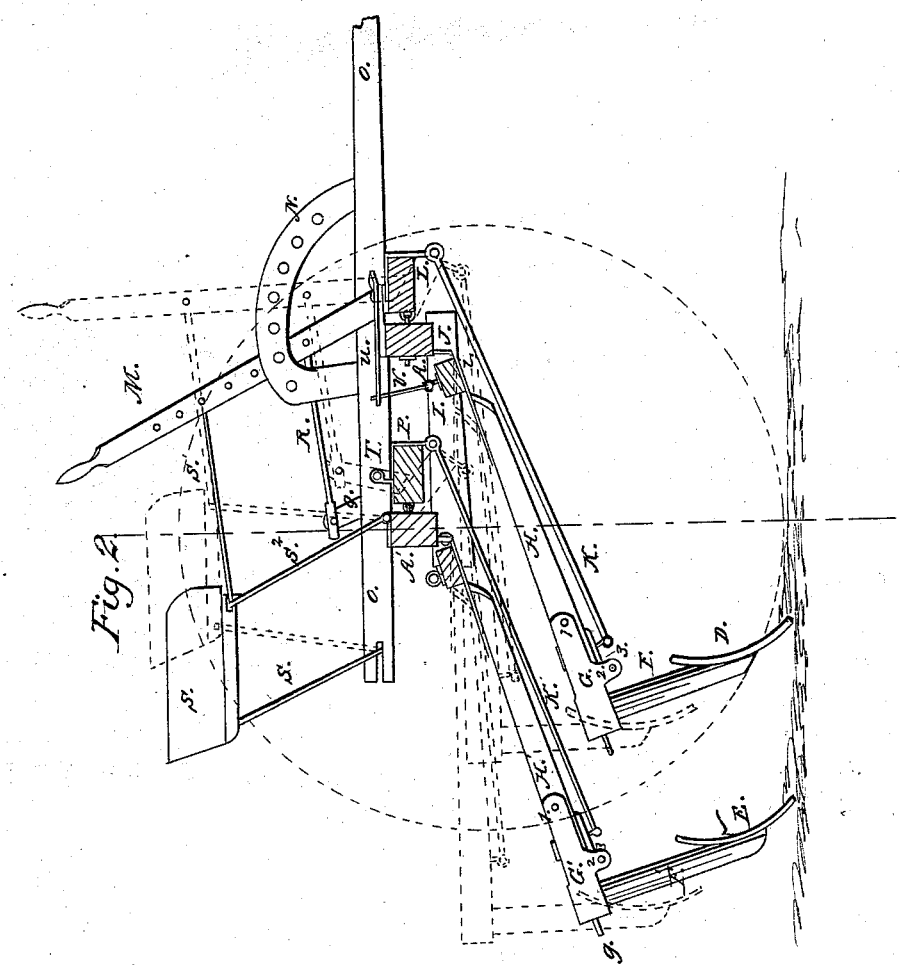
Witnesses:
Jas. G. Peyton
Oskar Hase
Inventor:
Cyrus Roberts
by his Attys
Baldwin & Son

UNITED STATES PATENT OFFICE.

CYRUS ROBERTS, OF THREE RIVERS, MICHIGAN.

IMPROVEMENT IN CULTIVATORS.

Specification forming part of Letters Patent No. 48,445, dated June 27, 1865.

*To all whom it may concern:*

Be it known that I, CYRUS ROBERTS, of Three Rivers, in the county of St. Josephs and State of Michigan, have invented a new and useful Improvement in Cultivators, of which the following is a full, clear, and exact description, reference being had to the accompanying drawings, which make a part of this specification, and in which—

Figure 1 is a plan or top view of my improved cultivator; and Fig. 2 a view in elevation of the same, with the wheels removed. The black lines in this figure show the position of the parts when the plows are in the ground, and the blue lines their position when elevated.

The improvement herein claimed consists, first, in hinging the plow-beams to the frame and connecting them by means of stay-rods to flaps, likewise pivoted to the frame, substantially in the manner hereinafter described, whereby I am enabled to throw the plows out of the ground by acting upon the stay-rods; second, in mounting the driver's seat on radius bars and connecting it with the plows in such manner that the seat moves back and forth as the plows are lowered or raised, whereby I am enabled to counterbalance the machine, whether the plows be in or out of the ground; third, in combining the driver's seat with the plows by means of an adjustable connection, whereby I am enabled to balance the machine with drivers of different weights; fourth, in so combining the driver's seat with the plows that the driver can employ his whole weight in lifting them; fifth, in a novel arrangement of devices for shifting the plows laterally; sixth, in attaching the stay-rod directly to the plow-beam and hinging the shovel stock to the beam, so as to play vertically, and locking it by a wooden pin, which breaks when an obstacle is encountered and allows the shovel to yield without releasing the stay-rod; seventh, in mounting the shovels in round stocks, inserted in sockets of a corresponding shape, and held by a set-screw, to permit of their being turned at a greater or less angle to the furrow.

To carry out the objects of my invention I mount a stout main frame, A A', on two wheels, B, by means of independent axles $b$, fastened to the under side of the frame, so as to leave an unobstructed space beneath it.

The plows D E are united to round shanks F F', inserted in sockets G G', (in which they can be turned to adjust the plows to any desired angle to the crop,) and held by set-screws $g$. The sockets are secured to the plow-beams H H'. Those of the front plows are attached to a sliding bar, I, by means of slotted brackets and set-screws, in such manner as to permit of their being adjusted and held at any desired lateral distance apart. The sliding bar is pivoted by loops $i$ to a slide-rod, J, under the front cross-pieces of the frame, so as to move freely thereon, both vertically and laterally. The sockets G G' turn vertically on pivots 1, on the plow-beams, but are ordinarily held rigidly by wooden pins 2, passing through lugs in the sockets, and in pieces 3, bolted to the under sides of the beams. The front pieces are connected by stay-rods K to the front of a flap, L, hinged to the front cross-bar of the frame, and controlled by a lever, M, rigidly secured thereto. This lever is held at any desired position by means of a spring-detent, $m$, taking into one of a series of holes in an arc, N, upon the tongue O, which is rigidly secured to the frame. The rear plows, E, are in a similar manner connected by their beams to the rear cross-bars, A', of the frame, and by the stay-rods to a flap, P, pivoted to the same cross-bar. The two sets of plows are connected by an upright, Q, and link R, attached to the hand-lever M.

The seat S for the driver is pivoted to the rear end of the tongue and to the frame by radius bars or standards $s$ $s^2$, which permit it to move freely backward and forward. It is likewise connected to the hand-lever M by a link, $s'$.

Foot-rests T are mounted on the flap P, for a purpose hereinafter described.

The front plows are vibrated by means of elbow-levers U (operated by the feet of the driver) pivoted to play horizontally on the frame, and connected to the slide-bar by link-rods V.

The operation of the machine is as follows: The parts when cultivating assume the position shown by the black lines in the drawings. The line of draft being below the axle, the tendency of the plows is to draw down the front of the frame, and thus cause a strain upon the necks of the horses. In this situation, however, it will be observed that the driver's seat is thrown back and that the pull of the link-rod S on the hand-lever M (caused by the weight of the driver) tends to lift the front of the frame, and thus counteract the draft of the shovels. The driver can lift the shovels out of the ground by releasing the catch from the detent and either shoving forward the hand-lever M, or by throwing his weight upon the foot-boards T, or by both combined, when the parts assume the position shown by the blue lines in Fig. 2. The shovels are now thrown back and the tongue is relieved from their weight. The driver's seat moves forward in a corresponding degree, and the equilibrium of the machine is again restored. It will thus be seen that my improvement enables me to balance the machine, both when the shovels are in the ground and when lifted out of it.

When working the plows are readily shifted from side to side by the driver alternately pressing with his feet on the elbow-levers U. Should one of the shovels strike an obstacle the wooden pin would break and leave the shovel free to yield on its pivot, and thus prevent its breaking.

It will be seen that the stay-rods are attached to the drag-beams instead of to the shovel-stocks; consequently when the pin breaks the stay-rods remain as before instead of falling to the ground, as they would do if attached to the shovel-stock by the wooden pin.

As the driver's seat is connected with the detent-lever M, and as all the plows are connected to this lever, any movement of the lever must change the position of the seat and plows, and vice versa.

The link s connecting the seat and lever may be inserted in any one of a series of holes in the lever, and thus adjust the seat backward or forward on the frame, as may be desired. The preponderance of weight in front of the axle can thus be counterbalanced, and the machine be adapted to drivers of different weights.

In lifting the plows the flaps L P are depressed, and the entire lifting is done by the thrust of the stay-rods K K'.

What I claim as my invention, and desire to secure by Letters Patent of the United States, is—

1. The combination of the plow-beams with the flaps and stay-rods, substantially in the manner described, for the purpose for forth.

2. The combination of the frame, the movable driver's seat, and the plows, substantially as and for the purpose described.

3. The combination of the adjustable driver's seat and hand-lever with the adjustable link-rod s, as and for the purpose described.

4. The combination of the frame, the driver's seat, and the plows, with the rear flap and stay-rods, substantially as described, whereby the driver can exert his whole weight in raising the plows, as set forth.

5. The combination of the frame and driver's seat with the shifting plows and elbow-levers, when arranged and operating as described.

6. The combination of the plow-beam and stay-rod with the hinged socket and wooden pin, when arranged and operating as described, for the purpose set forth.

In testimony whereof I have hereunto subscribed my name.

CYRUS ROBERTS.

Witnesses:
E. H. LOTHRUP,
WM. F. ARNOLD.